(12) United States Patent
Dusert

(10) Patent No.: US 11,167,809 B2
(45) Date of Patent: Nov. 9, 2021

(54) SUSPENSION SYSTEM FOR A CABIN OF A LAND VEHICLE

(71) Applicant: Volvo Truck Corporation, Gothenburg (SE)

(72) Inventor: Christophe Dusert, Saint Denis en Bugey (FR)

(73) Assignee: Volvo Truck Corporation, Gothenburg (SE)

(*) Notice: Subject to any disclaimer, the term of this patent is extended or adjusted under 35 U.S.C. 154(b) by 101 days.

(21) Appl. No.: 16/753,963

(22) PCT Filed: Oct. 9, 2017

(86) PCT No.: PCT/EP2017/075606
§ 371 (c)(1),
(2) Date: Apr. 6, 2020

(87) PCT Pub. No.: WO2019/072358
PCT Pub. Date: Apr. 18, 2019

(65) Prior Publication Data
US 2020/0391810 A1    Dec. 17, 2020

(51) Int. Cl.
*B62D 33/06* (2006.01)
*B60G 99/00* (2010.01)

(52) U.S. Cl.
CPC ....... *B62D 33/0604* (2013.01); *B60G 99/006* (2013.01); *B60G 2204/162* (2013.01)

(58) Field of Classification Search
CPC ............... B62D 33/06; B62D 33/0604; B62D 33/0608; B62D 33/067; B60G 99/006; B60G 2204/162
(Continued)

(56) References Cited

U.S. PATENT DOCUMENTS 3,380,773 A * 4/1968 Sewelin .............. B62D 33/067
                                                              296/190.05
5,553,911 A   9/1996 Bodin et al.
(Continued)

FOREIGN PATENT DOCUMENTS

WO    2012/158146 A1    11/2012

OTHER PUBLICATIONS

International Search Report and Written Opinion for International Patent Application No. PCT/EP2017/075606, dated Jul. 3, 2018, 9 pages.

*Primary Examiner* — Gregory A Blankenship
(74) *Attorney, Agent, or Firm* — Withrow & Terranova, PLLC

(57) ABSTRACT

A suspension system (2) comprising two flanges (10A, 10B), defining respective absolute reference positions, the second flange (10B) defining a relative reference position relative to the first flange (10A); and a core member (17), which is mobile only along a two degrees of freedom (M19, R19), a damper (21) applying an elastic return for bringing back the core member (17) to two degree reference positions; wherein the positions of the flanges (10A, 10B) and of the core member (17) are mechanically linked so that: when the flanges (10A, 10B) are in the absolute reference positions, the core member (17) is in the two degree reference positions; when the second flange (10B) is away from the relative reference position, the core member is away from the first degree reference position; and when the flanges (10A, 10B) are away from the absolute reference positions, the core member is away from the second degree reference position.

13 Claims, 3 Drawing Sheets

(58) Field of Classification Search
USPC ............ 296/190.07; 180/89.13, 89.14, 89.18
See application file for complete search history.

(56) References Cited

U.S. PATENT DOCUMENTS

| | | | | |
|---|---|---|---|---|
| 5,967,597 | A * | 10/1999 | Vander Kooi | B60G 99/004 180/89.13 |
| 6,168,229 | B1 | 1/2001 | Kooi et al. | |
| 6,454,035 | B1 * | 9/2002 | Waskow | B62D 33/067 180/69.21 |
| 6,758,294 | B2 * | 7/2004 | Peddycord | B62D 33/0604 180/89.12 |
| 9,238,489 | B2 * | 1/2016 | Schauer | B62D 33/0608 |
| 2002/0162697 | A1 * | 11/2002 | Taylor | B62D 33/0608 180/89.13 |
| 2014/0319876 | A1 * | 10/2014 | Schauer | B60G 99/008 296/190.07 |
| 2020/0391810 | A1 * | 12/2020 | Dusert | B62D 33/06 |

\* cited by examiner

SUSPENSION SYSTEM FOR A CABIN OF A LAND VEHICLE

This application is a 35 USC 371 national phase filing of International Application No. PCT/EP2017/075606, filed Oct. 9, 2017, the disclosure of which is incorporated herein by reference in its entirety.

The present invention concerns a suspension system for a cabin of a land vehicle, and a land vehicle comprising such a suspension system.

The present invention is related to the domain of shock absorbers for vehicles.

A cabin suspension system for a truck is known from WO 2012/158146 A1. This suspension system has a first front suspension mount, a second front suspension mount, and a rear suspension system. The rear suspension system has a first angled linking arm, a second angled linking arm, and a spring assembly. The first angled linking arm connects to the vehicle frame and to the cab. The second angled linking arm connects to the vehicle frame and to the cab. The spring assembly connects to the cab and to the vehicle frame. The first angled linking arm and the second angled linking arm are arranged to form a generally V-shape. However, this known system does not provide for an anti-roll of the cabin.

Another cabin suspension system is known, where the cabin is connected to a frame of the truck by means of a front suspension system. This system includes a left linking arm, connecting a left part of the cabin to a left part of the frame, and a right linking arm, connecting a right part of the cabin to a right part of the frame. Each arm is connected to the cabin respectively by means of a respective spring, so that each transversal side of the cabin is individually suspended by one of said springs. The arms are also connected together by means of a transversal torsion rod, sometimes called anti-roll bar, sway bar, or stabilizer bar. This bar is torsionnally flexible, for differential equilibration of the positions of said arms. This bar tends to reduce the positional differences between the two sides of the cabin for avoiding an excessive roll thereof.

However, this transversal torsion rod can be difficult to tune, since the equilibration between the arms depends on the structure, geometry and dimensions of the rod. In addition, such a torsional rod occupies a substantial space, crossing the vehicle along a transversal axis, from one side to the other.

Thus, an aim of the present invention is to provide a new suspension system ensuring an anti-roll function and an individual suspension function for two respective sides of the cabin, as well as optimized space-requirement and easier maintenance and tuning.

To this end, the invention provides a new suspension system according to claim 1.

In the invention, the two flanges, fixed relative to the cabin, and the frame, fixed relative to the chassis, are connected together by means of the rods, the core member and the damper. The damper applies the elastic return to the core member, transmitted to the flanges by the rods. The rods convert differential movements of the flanges into movements of the core member along the first degree of freedom, so that the damper may apply the anti-roll function, basically a differential damping, to the flanges through the rods and the core member. The rods convert coordinated movements of the flanges into movements of the core member along the second degree of freedom relative to the frame, so that the damper may apply an individual suspension function to each of the two flanges through the rods and the core member.

In the invention, the anti-roll function and the individual suspension function are both applied by the damper to one single core member, so as to simplify maintenance and/or tuning of the suspension system. Thus, only one area of the system advantageously needs to be accessed for performing said maintenance and tuning, this area being centered on the core member.

In the invention, the core member may be positioned at any desired location relative to the frame, since the core member is connected to the flanges by means of the rods, so as to free space if needed. In particular, space may be left free between the flanges for housing an engine radiator or any other desired component of the land vehicle.

In addition, the suspension system of the invention has the surprising effects of being more durable and comfortable than the abovementioned prior art systems.

Additional advantageous features of the invention are specified in claims 2 to 12.

The invention also provides a land vehicle according to claim 13.

The invention will be better understood upon reading the following description, provided solely as an example and provided in reference to the annexed drawings, in wherein:

FIG. 4 is a schematic view of a land vehicle comprising the suspension system of the FIGS. 1-3.

Figure 1:
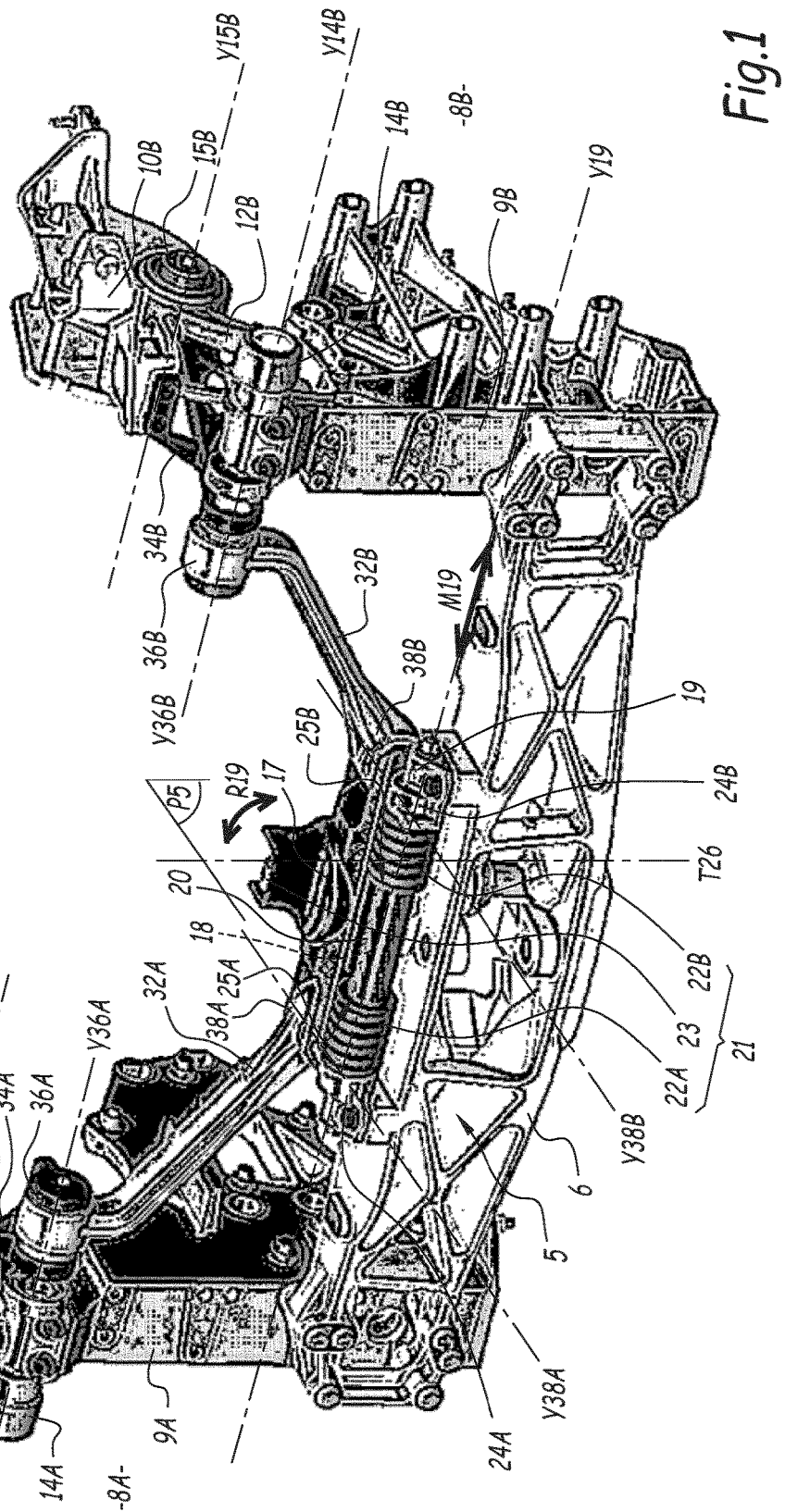
FIG. 1 is a perspective view of a suspension system according to the invention.
Figure 2:
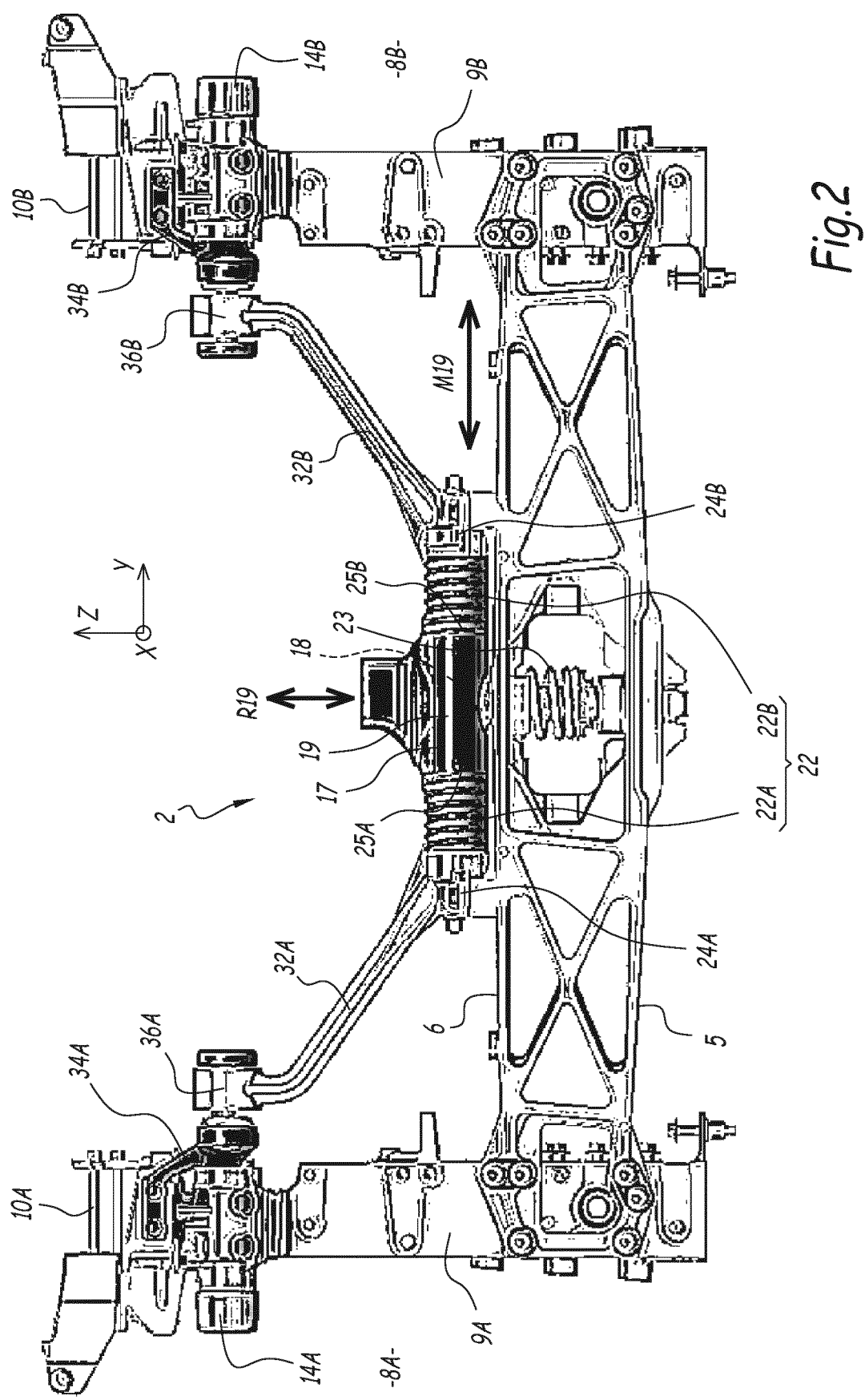
FIG. 2 is a front elevation view of the suspension system of FIG. 1.
Figure 3:
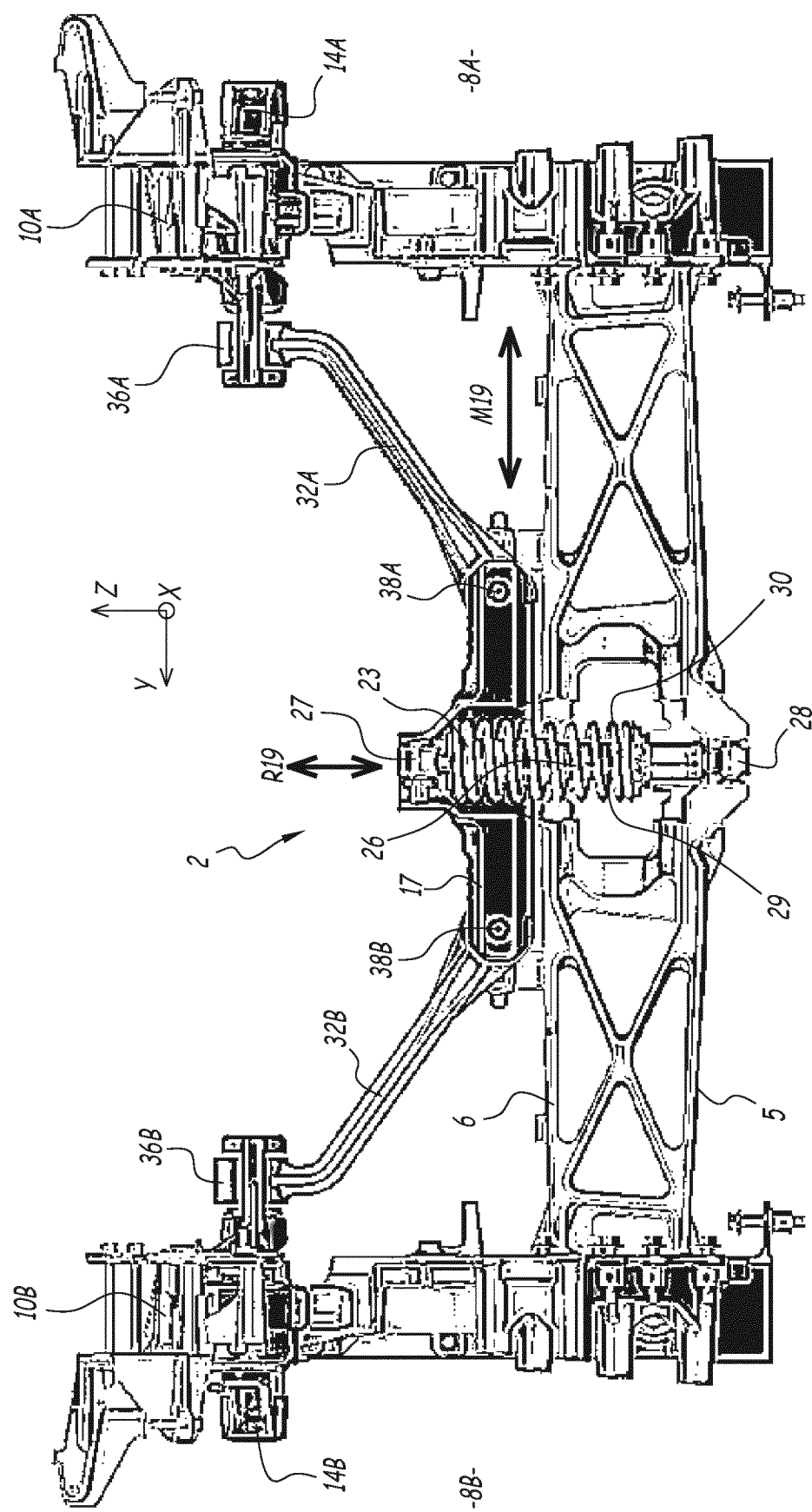
FIG. 3 is a back elevation view of the suspension system of FIGS. 1 and 2.

FIGS. 1 to 3 illustrate a suspension system 2 for suspending a cabin 3 of a land vehicle 1, relative to a chassis 4 thereof.

An example of said vehicle 1 is illustrated on FIG. 4, where said system 2 is interposed between the cabin 3 and the chassis 4, covered under said cabin 3. In the present example, the vehicle 1 is a road tractor or lorry, configured for traction of trailers for forming a truck. The vehicle 1 may be any other kind of truck. The vehicle may also be any land vehicle equipped of wheels, like a car, a coach, said wheels being connected to a chassis of the vehicle, supporting a cabin by means of the suspension system.

The suspension system 2 is spatially defined relative to a Cartesian coordinate system XYZ shown on FIGS. 1 and 4. In the present document, unless contrarily stated:

- the term "longitudinal" refers to orientations parallel to axis X, the terms such as "front" referring to a direction parallel to axis X directed towards the bottom of FIG. 1, while the terms such as "back" referring to an opposite direction;
- the terms such as "transversal" or "lateral" refer to orientations parallel to axis Y, the term "left" referring to a direction parallel to axis Y directed to the right of FIG. 1, and "right" to an opposite direction; and
- the terms such as "over", "upper", "at the top of" refer to a direction parallel to axis Z, directed towards the top of FIGS. 1 and 4, whereas the contrary terms such as "under", "lower", "at the bottom of" refer to an opposite direction.

The suspension system 2 comprises a frame 5, configured to be fixedly connected to the chassis 4. The frame 5 is fixed relative to the coordinate system XYZ. "Fixedly connected" includes a preferential embodiment where the frame 5 is actually part of the chassis 4 and an embodiment where the frame 5 is fixedly secured to the chassis 4.

The frame 5 comprises a transversal beam 6, extending parallel to a transversal axis Y of the coordinate system XYZ, and located at the bottom of the system 2. As shown on FIG. 4, when the system 2 is implemented onto the vehicle 1, the axis Y is preferably parallel to the wheel rotation axes. In this situation, the beam 6 is located at the front of the vehicle 1, close to a front grille thereof.

The beam 6 links a right transversal side 8A and a left transversal side 8B of the system 2. A medial plane P5 of the system 2, parallel to the axes X and Z and fixed relative to the frame 5, separates side 8A from side 8B. In other words, side 8A is defined on one side of plane P5, whereas side 8B is defined on the other side of plane P5. The plane P5 is positioned at a medium transversal location of the beam 6. The beam 6 crosses said plane P5 orthogonally.

The fame 5 also comprises a right pillar 9A, located at side 8A, and a left pillar 9B, located at side 8B. Each pillar 9A and 9B extends parallel to axis Z. Each pillar 9A and 9B is fixedly connected to one respective end of beam 6 and directed upwards. Thus, in the present embodiment, the frame 5 is U-shaped.

The system 2 comprises a right flange 10A, located at side 8A, over or close to an upper end of pillar 9A, and a left flange 10B, located at side 8B, over or close to an upper end of pillar 9B. Each flange 10A and 10B is configured to be fixedly connected to the cabin 3. "Fixedly connected" includes a preferential embodiment where the flanges 10A and 10B are actually part of the cabin 3 and an embodiment where the flanges 10A and 10B are fixedly secured to the cabin 3. The flanges 10A and 10B may move relatively to each other, by deformability or elasticity of the cabin 3. The flanges 10A and 10B are suspended parts of the system 2, mobile relative to the frame 5, as explained below.

The flanges 10A and 10B are respectively connected to the pillars 9A and 9B, by means of a right arm 12A and a left arm 12B of the system 2. The arm 12A is located at the side 8A while the arm 12B is located at side 8B.

The arms 12A and 12B connect the respective flanges 10A and 10B to the frame as crank-arms, as explained below.

The arm 12A comprises a right arm-cabin hinge 15A, rotatably connecting the arm 12A to the flange 10A. The hinge 15A enables rotation of the flange 10A relative to the arm 12A around one transversal axis Y15A, parallel to axis Y and fixed relative to the arm 12A. The arm 12A comprises a right arm-chassis hinge 14A, rotatably connecting the arm to the pillar 9A. The hinge 14A enables rotation of the arm 12A relative to the frame 5 around only one transversal axis Y14A, parallel to axis Y and fixed relative to the arm 12A. The axes Y14A and Y15A are maintained substantially parallel and at constant distance from each other, in particular by rigidity of the arm 12A.

The arm 12B comprises a left arm-cabin hinge 15B, rotatably connecting the arm 12B to the flange 10B. The hinge 15B enables rotation of the flange 10B relative to the arm 12B around one transversal axis Y15B, parallel to axis Y and fixed relative to the arm 12B. The arm 12B comprises a left arm-chassis hinge 14B, rotatably connecting the arm to the pillar 9B. The hinge 14B enables rotation of the arm 12B relative to the frame 5 around only one transversal axis Y14B, parallel to axis Y and fixed relative to the arm 12B. The axes Y14B and Y15B are maintained substantially parallel and at constant distance from each other, in particular by rigidity of the arm 12B.

Preferably, each hinge 15A and 15B is provided with a silent bloc, or any similar elastic member or bushing, for applying an elastic torque around axes Y15A and Y15B, to the flange 10A or 10B relative to the concerned arm 12A or 12B, when the flange 10A or 10B is rotated away from a angular reference position relative to said arm 12A or 12B.

Alternatively or additionally, each elastic bushing of hinges 15A and 15B enables that the concerned flange 10A or 10B is allowed to rotate, relative to the concerned arm 12A or 12B, around a supplementary axis, perpendicular to the concerned axis Y15A or Y15B and parallel to plane P5. In this case, each elastic bushing may apply an elastic torque onto the concerned flange 10A or 10B relative to the concerned arm 12A or 12B around said supplementary axis.

For achieving a similar rotation without elastic bushing, each or both hinges 15A and 15B may be replaced with a ball-and-socket-type joint.

Depending on the situation, alternative connecting means than the arms 12A and 12B may be provided for connecting the flanges 10A and 10B to the frame 5. Whatever the connecting means, the flanges 10A and 10B are mobile relative to the frame 5 and relative to each other.

The flange 10A is illustrated on FIGS. 1-3 at an absolute reference position relative to the frame 5. This absolute reference position corresponds to an initial position of the flange 10A relative to the frame 5. The flange 10A may be positioned away from this absolute reference position, for example during use of the vehicle 1, if the vehicle 1 is inclined relative to the gravitational direction, or if the vehicle 1 is accelerated.

Similarly, the flange 10B is illustrated on FIGS. 1-3 at an absolute reference position relative to the frame 5. This absolute reference position corresponds to an initial position of the flange 10B relative to the frame 5. The flange 10B may be positioned away from this absolute reference position, for example during use of the vehicle 1, if the vehicle 1 is inclined relative to the gravitational force or if the vehicle 1 is accelerated.

Also, the flange 10B is illustrated on FIGS. 1-3 at a relative reference position relative to the flange 10A. This relative reference position corresponds to a situation where the flanges 10A and 10B are positioned at the same axial position along axis Z and/or at the same axial position along axis X, and/or at the same angular position around axis Y. For example, in this situation, the flanges 10A and 10B are at an equal position relative to the frame 5, in projection to the plane P5. If the flanges 10A and 10B are moved differentially relative to the frame 5, this means that the flange 10B is moved away from the relative reference position, relative to the flange 10A.

The system 2 comprises a core member 17, located between the beam 6 and the pair of axes Y14A and Y14B. Member 17 is located at an intermediate, or central, location between the flanges 10A and 10B. In other words, member 17 is between the pillars 9A and 9B, at the top of the beam 6.

The core member 17 is connected to the frame 5, more specifically to the top of beam 6, by means of a core joint 19. In the present example, the joint 19 is a slider hinge allowing mobility of the member 17 relative to the frame 5, only with:
  a translation M19 of the member 17, relative to the frame 5, parallel to a transversal axis Y19 fixed relative to the frame 5, said axis Y19 called "reference transversal axis" and being parallel to axis Y; and
  a rotation R19 of the member 17, relative to the frame 5, around axis Y19.

Axis Y19 preferably extends between the beam 6 and the pair of axes Y14A and Y14B, closer to the beam 6.

In the illustrated example, the joint 19 comprises, fixed to the frame 5, a transversal bar 18, coaxial with axis Y19, and two supporting parts 24A and 24B. The transversal bar 18 is secured parallel to the beam 6 by the supporting parts 24A and 24B, at either ends of said transversal bar 18. The transversal bar 18 crosses plane P5 and is perpendicular thereto. The joint 19 comprises a sleeve 20, coaxial to axis Y19 and secured to the member 17. The sleeve 20 is slidably and rotatably mounted around the bar 18 along axis Y19, thus achieving the aforementioned translation M19 and rotation R19 of the member 17 relative to the frame 5.

More generally, the joint 19 allows a mobility of the member 17 relative to the frame 5 only along two distinct degrees of freedom, out of the six mechanical degrees of freedom well known in the arts of solid mechanics. By "six degrees of freedom", it is meant freedom of motion of a first solid relative to second solid, said motion comprising six parameters defined in six distinct coordinates. More specifically, the first solid may be translated independently along the three coordinates x, y and z of the coordinate system XYZ, each of these three coordinates x, y and z corresponding to one degree of freedom. The coordinates x, y and z respectively define axial positions along axes X, Y and Z. The first solid may also be rotated independently around three coordinates Rx, Ry and Rz of the coordinate system XYZ, each of these other three coordinates corresponding to one degree of freedom. The coordinates Rx, Ry and Rz respectively define angular positions around axes X, Y and Z.

In the present case, the chosen first degree of freedom is the translation M19 of member 17 relative to the frame 5 along axis Y19, and the chosen second degree of freedom is the rotation R19 of said member 17, relative to the frame 5, around axis Y19.

On FIGS. 1-3, the core member 17 is illustrated as positioned at a reference position. This reference position includes that the member 17 is at an axial reference position of the translation M19 along the axis Y19, and at an angular reference position of rotation R19 around axis Y19, relative to the frame 5.

In the present example, the axial reference position corresponds to a situation where the core member 17 is centered at plane P5 along axis Y19.

In the present example, the angular reference position corresponds to a situation where axis X38A and X38B, defined below, are parallel to the plane XY.

If other degrees of freedom are chosen for the core member 17 than translation M19 and rotation R19, the core member defines a degree reference position of the first chosen degree of freedom and a degree reference position of the second chosen degree of freedom.

When the core member 17 is positioned at the reference position of the first degree of freedom and at the reference position of the second degree of freedom, relative to the frame 5, the system 2 is said to be in "uncompensated configuration". As explained below, in this uncompensated configuration, the flanges 10A and 10B are at their absolute and relative reference position.

The system 2 comprises a right rod 32A and a left rod 32B. The rod 32A is located at side 8A, and the rod 32B at side 8B. The flange 10A is connected to the core member 17 by means of the rod 32A and the flange 10B is connected to the core member 17 by means of the rod 32B.

In the present example, for connecting the rod 32A to the flange 10A, the system 2 comprises a right rod-flange hinge 36A. The hinge 36A rotatably connects the rod 32A to the flange 10A, allowing rotation only around a transversal flange axis Y36A, parallel to axis Y19 and fixed relative to the flange 10A. The hinge 36A is advantageously connected to the flange 10A by means of a leg 34A of the flange 10A. The arm 12A extends at the right of the pillar 9A, while the leg 34A extends at the left of the pillar 9A.

In the present example, for connecting the rod 32B to the flange 10B, the system 2 comprises a left rod-flange hinge 36B. The hinge 36B rotatably connects the rod 32B to the flange 10B, allowing rotation only around a transversal flange axis Y36B, parallel to axis Y19 and fixed relative to the flange 10B. The hinge 36B is advantageously connected to the flange 10B by means of a leg 34B of the flange 10B. The arm 12B extends at the left of the pillar 9B, while the leg 34B extends at the right of the pillar 9B.

In the present example, for connecting the rod 32A to the core member 17, the system comprises a right rod-core hinge 38A, rotatably connecting the rod 32A to the core member 17. The rotation is allowed around only a right core axis X38A, said axis X38A being perpendicular, or radial, to the axis Y19.

In the present example, for connecting the rod 32B to the core member 17, the system comprises a left rod-core hinge 38B, rotatably connecting the rod 32B to the core member 17. The rotation is allowed around only a left core axis X38B, said axis X38B being perpendicular, or radial, to the axis Y19.

The axes X38A and X38B are parallel and preferably located respectively at side 8A and side 8B.

Thanks to the hinges 36A, 36B, 38A and 38B, the position of the flange 10A, the position of the flange 10B and the position of the core member 17 relative to the frame are mechanically linked by means of the rods 32A and 32B.

Thus, as depicted on FIGS. 1 to 3, when the both flanges 10A and 10B are in their respective absolute reference position, the core member is in its reference position for both degrees of freedom, namely in the first degree reference position and in the second degree reference position. In this case, the uncompensated configuration is obtained.

When the flanges 10A or 10B are positioned so that flange 10B is positioned away from the relative reference position relative to the flange 10A, the core member 17 is positioned away from the axial reference position, namely the reference position of the first degree. In this example, when one of the flanges 10A or 10B is higher than the other, the core member 17 is moved right or left from the medial plane P5, along axis Y19. In other words, a difference of position between the flanges 10A and 10B imparts that the core member 17 is positioned at a position different from the axial reference position along axis Y19, or more generally, changes position along the first degree of freedom. Thus, an inclination of the cabin 3 relative to the chassis 4 around an axis parallel to axis X has a tendency to move the member 17 along axis Y19 relative to the frame 5. In other words, an inclination of the cabin 3 relative to the chassis 4 around an axis parallel to axis X has a tendency to move the member 17 along the first degree of freedom.

When the flange 10A is positioned away from the first absolute reference position relative to the frame 5, and/or when the flange 10B is positioned away from second the absolute reference position relative to the frame 5, the core member 17 is positioned away from the angular reference position, namely the reference position of the second degree. In this example, when the flanges 10A and 10B are moved according to an identical pattern relative to the frame 5, so that the relative position of flanges 10A and 10B is kept identical along axis Y, along axis Z and around axis X, the core member 17 is moved only in rotation around axis Y19 relative to the frame 5. Thus, the common movements of the flanges 10A and 10B relative to the frame 5 are mechanically linked to the angular position of the core member 17 around axis Y19, namely the second degree of freedom, relative to the frame 5. Thus, an inclination of the cabin 3 relative to the chassis 4 around an axis parallel to axis Y has a tendency to rotate the member 17 around axis Y19 relative to the frame 5. More generally, an inclination of the cabin 3 relative to the chassis 4 around an axis parallel to axis Y has a tendency to move the member 17 along the second degree of freedom.

In case only one of the flanges 10A and 10B is moved away from the absolute reference position, while the other is maintained at the absolute reference position relative to the frame, the core member 17 is halfway rotated around axis Y19 and halfway translated along axis Y19. In the case the flanges 10A and 10B are moved away from their respective reference position relative to the frame 5, and put to positions where flange 10B is away from the relative reference position relative to flange 10A, the core member 17 may be positioned away from both axial reference position and angular reference position.

Simultaneously, a movement or a force applied to the core member 17 relative to the frame 5 will be transmitted to the flanges 10A and 10B through the respective rods 32A and 32B. The axes Y36A and Y36B are spaced apart from the axis Y19, along axis Z. Also, hinges 36A and 36B are over hinges 38A and 38B. The hinges 36A and 36B are transversally more spaced than hinges 38A and 38B, which are located closer to the plane P5. The rods 32A and 32B are preferably slanted relative to the axis Y19. In other words, the rods 32A and 32B are inclined in an oblique way relative to axis Y19, arranged as a "V". The rods 32A and 32B are oriented away from each other, from their respective hinges 38A and 38B to their respective hinge 36A and 36B. More generally, the first rod 32A and the second rod 32B are oriented away from each other, from the core member 17 to the flanges 10A and 10B.

Thanks to the geometry of the core member 17 and the rods 32A and 32B, space is left free by the system 2 between the flanges 10A and 10B, which can prove useful for housing further equipment of the vehicle 1, such as an engine radiator. The core member 17 is indeed positioned lower than the hinges 14A and 14B, freeing space between them.

Preferably, when the core member 17 is in the reference position, namely in the uncompensated configuration illustrated in FIGS. 1, 2 and 3, the axes Y14A, Y14B, Y36A and Y36B are coaxial, fixed relative to the frame 5. This is obtained in particular thanks to the respective shapes of the legs 34A and 34B and the shape of the arms 12A and 12B. Thus, in this uncompensated configuration, the cabin 3 may be tilted forward, relative to the chassis 4, around these coaxial axes Y14A, Y14B, Y36A and Y36B, manually or by means of a tilt actuator of the vehicle 1, for granting access to parts of the vehicle located between the chassis 4 and the cabin 3.

The mobility of the core member 17 relative to the frame 5 is compensated by a damping system or damper 21. The damper 21 applies an elastic return, onto the core member 17 relative to the frame 5, for bringing back the core member to the reference position, relative to the frame 5. Thus, in the uncompensated configuration, the damper 21 does not exert any force and/or torque, or exerts compensating forces and/or torques, onto the member 17. When not in this uncompensated configuration, the system 2 is in a "compensated configuration", where the damper 21 exerts forces and/or torques tending to bring back the system into the uncompensated configuration.

The damper 21 comprises a first elastic member 22, exerting a first component of the elastic return along the first degree of freedom, in this example the translation M19, for bringing back the core member 17 to the degree reference position of this first degree of freedom. The elastic member 22 is preferably configured for applying an elastic return solely along the first degree of freedom. In the present example, the first elastic member 22 applies a transversal force, parallel to axis Y19, when the core member 17 is moved away from the reference axial position along axis Y19 relative to the frame 5. This transversal force is the first component of the elastic return. When the member 17 is moved left from the reference axial position, the force applied by the first elastic member 22 is directed to the right. When the member 17 is moved to the right from the reference axial position, the force applied by the first elastic member 22 is directed to the left.

As illustrated on FIGS. 1 and 2, the first elastic member 22 preferably comprises two antagonist transversal elastic members 22A and 22B, namely a right elastic member 22A and a left elastic member 22B. In the present example, each member 22A and 22B is embodied as a helical compression coil. However, any suitable axial elastic member may be used instead, such as one or more Belleville spring washers. Each of said transversal elastic members 22A and 22B is interposed between a respective:

frame transversal stop of the frame 5, both provided at the top of the beam 6, and core transversal stop of the core member 17, provided at either lateral sides of the core member 17.

In other words, the core member 17 and the members 22A and 22B are located transversally between the frame transversal stops.

Preferably, the members 22A and 22B are coaxial with axis Y19.

In the illustrated example, the frame transversal stops are formed by the two supporting parts 24A and 24B of the joint 19, while the core member transversal stops are formed by the lateral ends 25A and 25B of the sleeve 20.

The first elastic member 22 has a function of anti-roll of the flanges 10A and 10B. As in the present example, the invention enables that the anti-roll function may be achieved by an elastic member configured for saving transversal space and being easier to tune and maintain than a torsion bar.

As best visible on FIG. 3, the damper 21 comprises a second elastic member 23, separate from the first elastic member 22, exerting a second component of the elastic return along the second degree of freedom, in this example the rotation R19, for bringing back the core member 17 to the degree reference position of this second degree of freedom. The elastic member 22 is preferably configured for applying an elastic return solely along the second degree of freedom. In the present example, the second elastic member 23 applies a torque onto the core member 17 relative to the frame 5 around the axis Y19, when the core member 17 is rotated away from the reference angular position around axis Y19 relative to the frame 5. When the member 17 is rotated in a first direction of rotation from the angular reference position, the torque applied by the second elastic member 23 is directed to a second direction of rotation, opposed to the first direction of rotation. When the member 17 is rotated in the second direction from the angular reference position, the torque applied by the second elastic member 23 is directed to the first direction.

Preferably, the second elastic member 23 comprises a single tangential elastic member 26, interposed between the core member 17 and the frame 5, opposing to the rotation of the core member 17 away from the angular reference position. The tangential elastic member 26 extends tangentially to the axis Y19, ie. orthoradially.

In the present example, the tangential elastic member 26 comprises:
- an upper hinge 27, rotatably connecting the tangential elastic member 26 to the core member 17, around an axis parallel to the axis Y19
- a lower hinge 28, rotatably connecting the tangential elastic member 26 to the bottom of the beam 6 of the frame 5, around an axis parallel to the axis Y19;
- an axially extensible arm 29, connecting the hinges 27 and 28 in a rigid and retractable manner along an axis T26 crossing both axis of the hinges 27 and 28; and
- a compression spring 30, coaxially mounted around the arm 29 and interposed between the hinges 27 and 28.

Thanks to the invention, the second elastic member 23 ensures on its own individual suspension of both flanges 10A and 10B. Thus, tuning and maintenance are simplified, while space is saved compared to a case where two or more spatially separate devices are required for individually suspending flanges 10A and 10B.

The first elastic member 22 and the second elastic members 23 allow individual tuning of the anti-roll function, by tuning member 22, and of the individual suspension of the flanges 10A and 10B, by tuning member 23, which makes the system 2 very easy to tune.

Additionally or alternatively to the system 2, the back of the cabin 3 may be suspended relative to the chassis 4 based on a supplementary suspension system according to the invention. Alternatively, the cabin 3 may be suspended relative to the chassis 4 by one suspension system according to the invention, for example at the front or at the back of the cabin, and another system, which can be a simple transversal hinge connecting the cabin to the chassis, or a more elaborate system including further shock-absorption or anti-roll functions, or similar.

In other embodiments of the invention, two other distinct degrees of freedom may be chosen for mobility of the core member relative to the frame, for example two independent translations along two respective distinct axis of the coordinates system XYZ. Depending on the chosen first and second degrees of freedom for the core member 17, other connections than the depicted hinges 36A, 36B, 38A and 38B are to be used.

In another embodiment of the invention, the first elastic member may be comprised of a single elastic member, or of more than two separate elastic members.

In another embodiment of the invention, the second elastic member may be comprised of two or more separate elastic members.

Left and right may be inverted compared to the illustrated example, in the scope of the invention.

The invention claimed is:

1. A suspension system for a cabin of a land vehicle, the suspension system comprising:
   a frame, configured to be fixedly connected to a chassis of the land vehicle;
   a first flange, located at a first transversal side of the suspension system and configured to be fixedly connected to the cabin, the first flange being mobile relative to the frame and defining a first absolute reference position relative to the frame;
   a second flange, located at a second transversal side of the suspension system and configured to be fixedly connected to the cabin, the second flange being mobile relative to:
   the frame, the second flange defining a second absolute reference position relative to the frame, and
   the first flange, the second flange defining a relative reference position relative to the first flange; and
   a core member connected to the frame by:
   a core joint of the suspension system, so that the core member is mobile relative to the frame only along a first degree of freedom and along a second degree of freedom, and
   a damper, applying an elastic return onto the core member relative to the frame, for bringing back the core member to a first degree reference position of the first degree of freedom and to a second degree reference position of the second degree of freedom, relative to the frame;
   wherein the respective positions of the first flange and of the second flange are mechanically linked to the position of the core member by a first rod and a second rod of the suspension system, the first rod connecting the first flange to the core member and the second rod connecting the second flange to the core member, so that:
   when the first flange is in the first absolute reference position and the second flange is in the second absolute reference position, the core member is in the first degree reference position and in the second degree reference position;
   when the second flange is positioned away from the relative reference position relative to the first flange, the core member is positioned away from the first degree reference position; and
   when at least one of the first flange is positioned away from the first absolute reference position, or the second flange is positioned away from second the absolute reference position, the core member is positioned away from the second degree reference position.

2. The suspension system of claim 1, wherein the core joint is configured so that:
   the first degree of freedom is a translation parallel to a reference axis of the suspension system, said reference axis being perpendicular to a medial plane of the suspension system and fixed relative to the frame, the first transversal side and the second transversal side being respectively located at either sides of the medial plane; and
   the second degree of freedom is a rotation around the reference axis.

3. The suspension system of claim 2, wherein the suspension system comprises:
   a first rod-core hinge, rotatably connecting the first rod to the core member, around only a first core axis perpendicular to the reference axis; and
   a second rod-core hinge, rotatably connecting the second rod to the core member, around only a second core axis perpendicular to the reference axis.

4. The suspension system of claim 2, wherein the suspension system comprises:
   a first rod-flange hinge, rotatably connecting the first rod to the first flange around only a first flange axis, said first flange axis being parallel to the reference axis; and
   a second rod-flange hinge, rotatably connecting the second rod to the second flange around only a second flange axis, said second flange axis being parallel to the reference axis.

5. The suspension system of claim 1, wherein the suspension system further comprises:
   a first arm, located at the first transversal side and comprising:

a first arm-cabin hinge, rotatably connecting the first arm to the first flange, and a first arm-chassis hinge, rotatably connecting the first arm to the frame, the first arm-chassis hinge and the first arm-cabin hinge allowing rotation around parallel respective transversal axes; and a second arm, located at the second transversal side and comprising:

a second arm-cabin hinge, rotatably connecting the second arm to the second flange, and a second arm-chassis hinge, rotatably connecting the second arm to the frame, the second arm-chassis hinge and the second arm-cabin hinge allowing rotation around parallel respective transversal axes.

6. The suspension system of claim 4, wherein the suspension system further comprises:

a first arm, located at the first transversal side and comprising:

a first arm-cabin hinge, rotatably connecting the first arm to the first flange, and a first arm-chassis hinge, rotatably connecting the first arm to the frame, the first arm-chassis hinge and the first arm-cabin hinge allowing rotation around parallel respective transversal axes; and a second arm, located at the second transversal side and comprising:

a second arm-cabin hinge, rotatably connecting the second arm to the second flange, and a second arm-chassis hinge, rotatably connecting the second arm to the frame, the second arm-chassis hinge and the second arm-cabin hinge allowing rotation around parallel respective transversal axes;

wherein when the core member is in the first degree reference position and in the second degree reference position, the respective transversal axes of the first arm-chassis hinge and the second arm-chassis hinge are coaxial with the respective first and second flange axis of the first rod-flange hinge, the second rod-flange hinge.

7. The suspension system of claim 1, wherein the first rod and the second rod are oriented away from each other, from the core member to the first flange and second flange.

8. The suspension system of claim 1, wherein the damper comprises at least:

a first elastic member, exerting a first component of the elastic return along the first degree of freedom, for bringing back the core member to the first degree reference position; and a second elastic member, separate from the first elastic member, exerting a second component of the elastic return along the second degree of freedom, for bringing back the core member to the second degree reference position.

9. The suspension system of claim 2, wherein the damper comprises at least:

a first elastic member, exerting a first component of the elastic return along the first degree of freedom, for bringing back the core member to the first degree reference position; and a second elastic member, separate from the first elastic member, exerting a second component of the elastic return along the second degree of freedom, for bringing back the core member to the second degree reference position wherein the first elastic member comprises at least one transversal elastic member interposed between the core member and the frame, parallel to the reference axis.

10. The suspension system of claim 9, further comprising two antagonist transversal elastic members, each of said transversal elastic members being interposed between a respective frame transversal stop of the frame and a respective core transversal stop of the core member.

11. The suspension system of claim 8, wherein the second elastic member comprises at least one tangential elastic member, interposed between the core member and the frame, and extending tangentially to the reference axis.

12. The suspension system of claim 11, wherein the tangential elastic member comprises:

an upper hinge, rotatably connecting the tangential elastic member to the core member, around an axis parallel to the reference axis;

a lower hinge, rotatably connecting the tangential elastic member to the frame, around an axis parallel to the reference axis;

an extensible arm, connecting the upper hinge to the lower hinge; and a compression spring, interposed between the upper hinge and the lower hinge.

13. A land vehicle, comprising a cabin, a chassis and a suspension system, the suspension system comprising:

a frame, configured to be fixedly connected to a chassis of the land vehicle;

a first flange, located at a first transversal side of the suspension system and configured to be fixedly connected to the cabin, the first flange being mobile relative to the frame and defining a first absolute reference position relative to the frame;

a second flange, located at a second transversal side of the suspension system and configured to be fixedly connected to the cabin, the second flange being mobile relative to:

the frame, the second flange defining a second absolute reference position relative to the frame, and the first flange, the second flange defining a relative reference position relative to the first flange; and a core member connected to the frame by:

a core joint of the suspension system, so that the core member is mobile relative to the frame only along a first degree of freedom and along a second degree of freedom, and a damper, applying an elastic return onto the core member relative to the frame, for bringing back the core member to a first degree reference position of the first degree of freedom and to a second degree reference position of the second degree of freedom, relative to the frame;

wherein the respective positions of the first flange and of the second flange are mechanically linked to the position of the core member by a first rod and of a second rod of the suspension system, the first rod connecting the first flange to the core member and the second rod connecting the second flange to the core member, so that:

when the first flange is in the first absolute reference position and the second flange is in the second absolute reference position, the core member is in the first degree reference position and in the second degree reference position;

when the second flange is positioned away from the relative reference position relative to the first flange, the core member is positioned away from the first degree reference position; and when at least one of the first flange is positioned away from the first absolute reference position or the second flange is positioned away from second the absolute reference position, the core member is positioned away from the second degree reference position;
wherein the first flange and the second flange are fixedly connected to the cabin, and the frame is fixedly connected to the chassis.

* * * * *